United States Patent
Miyanari

(10) Patent No.: US 10,133,015 B1
(45) Date of Patent: Nov. 20, 2018

(54) OPTICAL CONNECTOR

(71) Applicant: Yazaki Corporation, Tokyo (JP)

(72) Inventor: Motonori Miyanari, Shizuoka (JP)

(73) Assignee: YAZAKI CORPORATION, Minato-ku, Tokyo (JP)

( * ) Notice: Subject to any disclaimer, the term of this patent is extended or adjusted under 35 U.S.C. 154(b) by 0 days.

(21) Appl. No.: 15/978,731

(22) Filed: May 14, 2018

(30) Foreign Application Priority Data

May 19, 2017 (JP) ................. 2017-099707

(51) Int. Cl.
*G02B 6/42* (2006.01)

(52) U.S. Cl.
CPC .................. *G02B 6/4215* (2013.01)

(58) Field of Classification Search
CPC .............. G02B 6/4204; G02B 6/4215
See application file for complete search history.

(56) References Cited

U.S. PATENT DOCUMENTS

| | | | | |
|---|---|---|---|---|
| 4,381,137 A | * | 4/1983 | Berg | G02B 6/2848 359/559 |
| H000491 H | * | 7/1988 | Pitruzzello | 385/140 |
| 4,942,623 A | * | 7/1990 | Asawa | G02B 6/24 380/54 |
| 5,243,681 A | * | 9/1993 | Bowen | G02B 6/266 359/885 |
| 6,404,951 B2 | * | 6/2002 | Danziger | G02B 6/14 385/123 |
| 6,504,975 B1 | * | 1/2003 | Yamagata | G02B 5/1876 385/33 |
| 7,075,117 B2 | * | 7/2006 | Yamada | G02B 6/4201 257/98 |
| 7,242,835 B2 | * | 7/2007 | Busse | G02B 6/262 385/125 |
| 9,110,246 B2 | * | 8/2015 | Berishev | G02B 6/32 |
| 2010/0271689 A1 | * | 10/2010 | Jasapara | G02B 6/0288 359/341.1 |

FOREIGN PATENT DOCUMENTS

JP   2002-023025 A   1/2002

* cited by examiner

*Primary Examiner* — Rhonda S Peace
(74) *Attorney, Agent, or Firm* — Sughrue Mion, PLLC

(57) ABSTRACT

An optical connector includes an optical filter 36 that is disposed between an end surface and a lens, and includes a through-hole that transmits part of the output light, when an inner diameter of the through-hole of the optical filter is denoted by B, a distance from the end surface to the optical filter in the optical axis direction is denoted by L, a maximum transmitted light output angle of transmitted light that passes through the through-hole and has a smaller angle than a maximum output angle $\alpha$ of output light is denoted by $\alpha'$, and an outer diameter of a core of an optical fiber is denoted by A, $B=2\times L\times\tan\alpha'-A$, and $L>A/\tan\alpha'/2$ are satisfied.

1 Claim, 5 Drawing Sheets

US 10,133,015 B1

OPTICAL CONNECTOR

CROSS-REFERENCE TO RELATED APPLICATION(S)

The present application claims priority to and incorporates by reference the entire contents of Japanese Patent Application No. 2017-099707 filed in Japan on May 19, 2017.

BACKGROUND OF THE INVENTION

1. Field of the Invention

The present invention relates to an optical connector.

2. Description of the Related Art

In recent years, in a vehicle such as an automobile, high-speed communication is achieved by replacing a communication system provided between various electronic devices, with the one using an optical fiber (for example, Japanese Patent Application Laid-open No. 2002-23025).

In the optical fiber, light that has entered a core propagates while repeating reflection at a boundary between the core and a clad. Among the light that propagates in the optical fiber, light with a large incident angle (hereinafter, also referred to as "higher-order light") proceeds while being reflected at a high angle, whereas light with a small incident angle (hereinafter, also referred to as "low-order light") proceeds while being reflected at a low angle. Because the higher-order light repeats reflection in the optical fiber a larger number of times, the higher-order light has an optical path length longer than that of the low-order light. For example, if a refractive-index distribution of the core is made constant, speeds of light proceeding in the optical fiber become the same. Thus, there arises a difference between the higher-order light and the low-order light in propagation time of light from an entrance end to an exit end of the optical fiber.

As mentioned above, output light emitted from the optical fiber includes both higher-order light and low-order light that have a difference in propagation time.

This causes such a problem that a waveform of an optical signal deteriorates, and high-speed communication cannot be achieved.

SUMMARY OF THE INVENTION

A purpose of the present invention is to provide an optical connector that can achieve high-speed communication.

According to one aspect of the present invention, an optical connector includes: an optical fiber; a light receiving member that is disposed to face an end surface in an optical axis direction of the optical fiber, and receives an output light emitted from the end surface; and an optical filter that is disposed between the end surface and the light receiving member, and includes a through-hole that transmits a part of the output light. When an inner diameter of the through-hole is denoted by B, a distance from the end surface to the optical filter in the optical axis direction is denoted by L, a maximum transmitted light output angle of a transmitted light that passes through the through-hole and has a smaller angle than a maximum output angle $\alpha$ of the output light is denoted by $\alpha'$, and an outer diameter of a core of the optical fiber is denoted by A, following formulae (1) and (2) are satisfied.

$$B = 2 \times L \times \tan \alpha' - A \quad (1)$$

$$L > A/\tan \alpha'/2 \quad (2)$$

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

An embodiment of an optical connector according to the present invention will be described in detail below with reference to the drawings. In addition, the present invention is not limited by the following embodiment. In addition, components in the following embodiment include the ones that can be replaced by those skilled in the art, and are easy, or the ones that are substantially identical.

Embodiment

Figure 1:
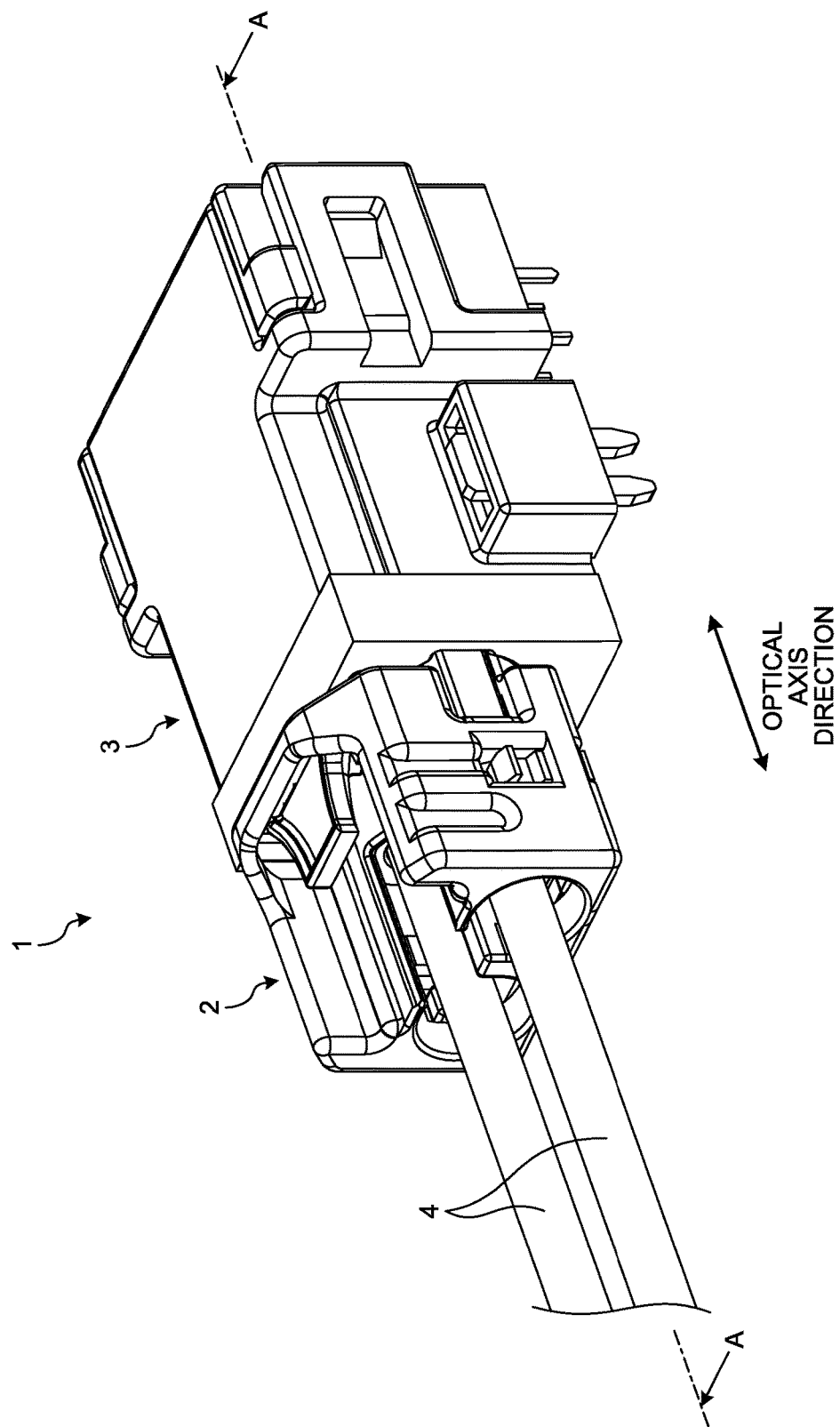
FIG. 1 is a perspective view illustrating a schematic configuration of an optical connector according to an embodiment.
Figure 2:
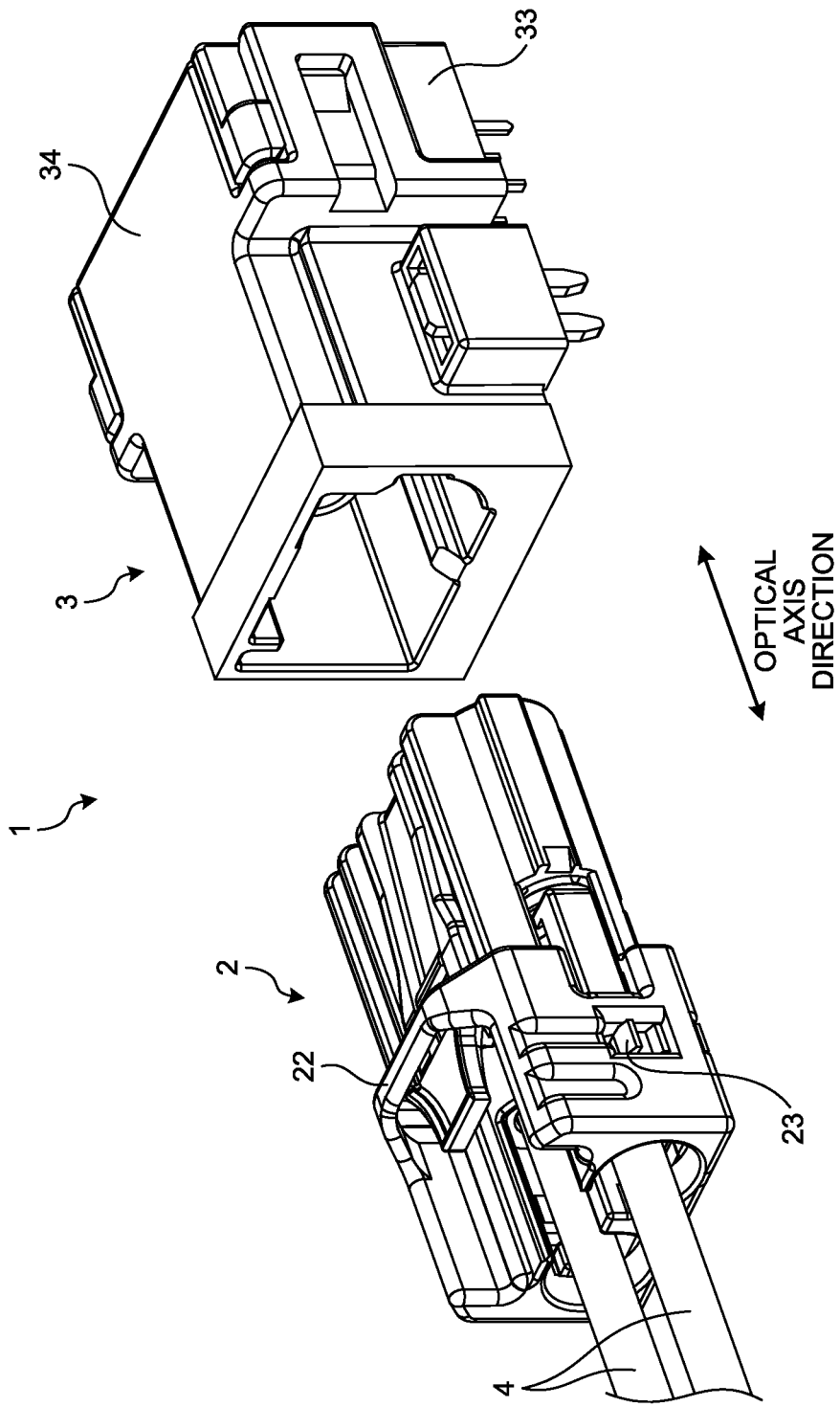
FIG. 2 is a perspective view illustrating a schematic configuration of the optical connector according to the embodiment.
Figure 3:
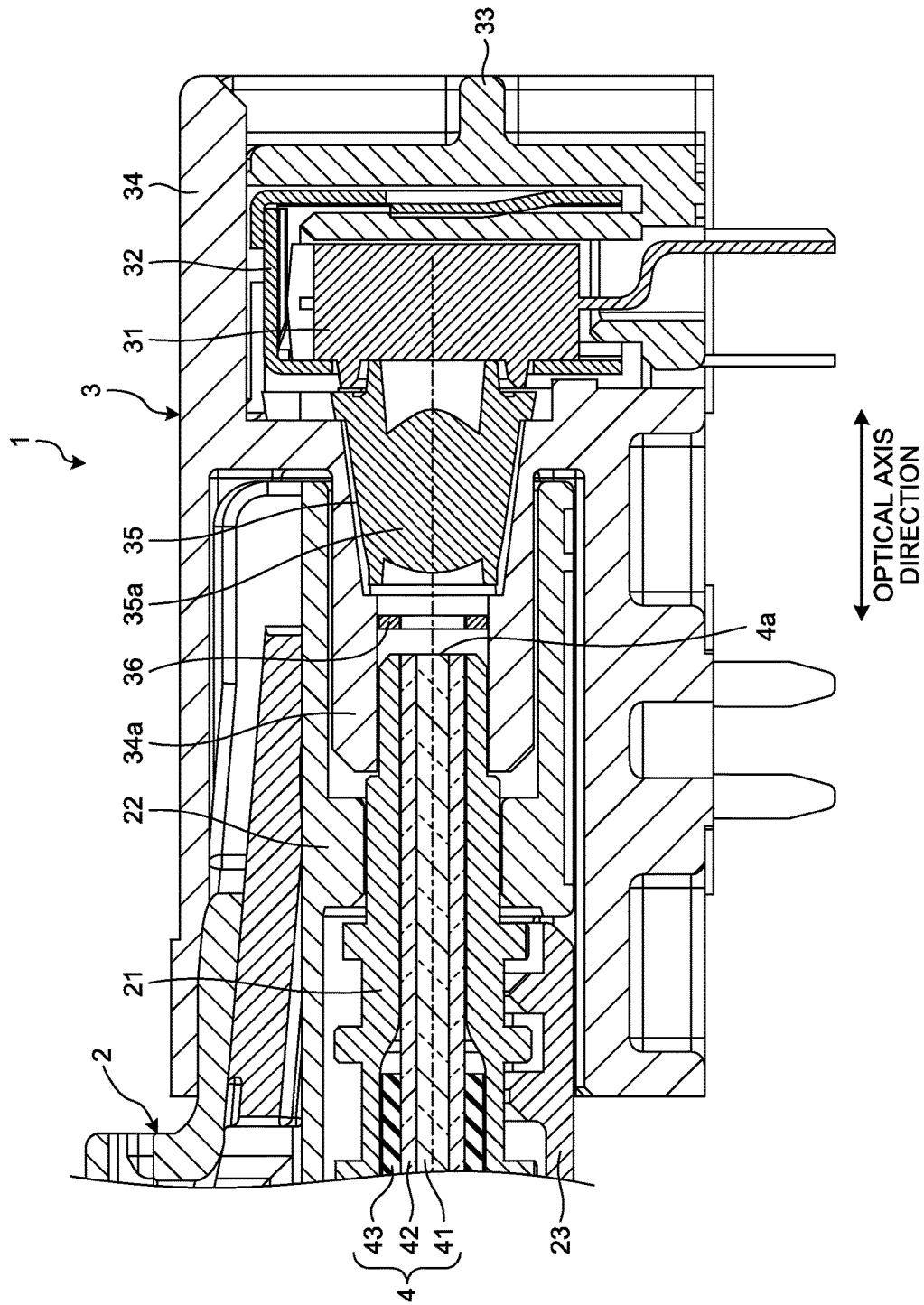
FIG. 3 is a cross-sectional view illustrating a schematic configuration of the optical connector according to the embodiment.
Figure 4:
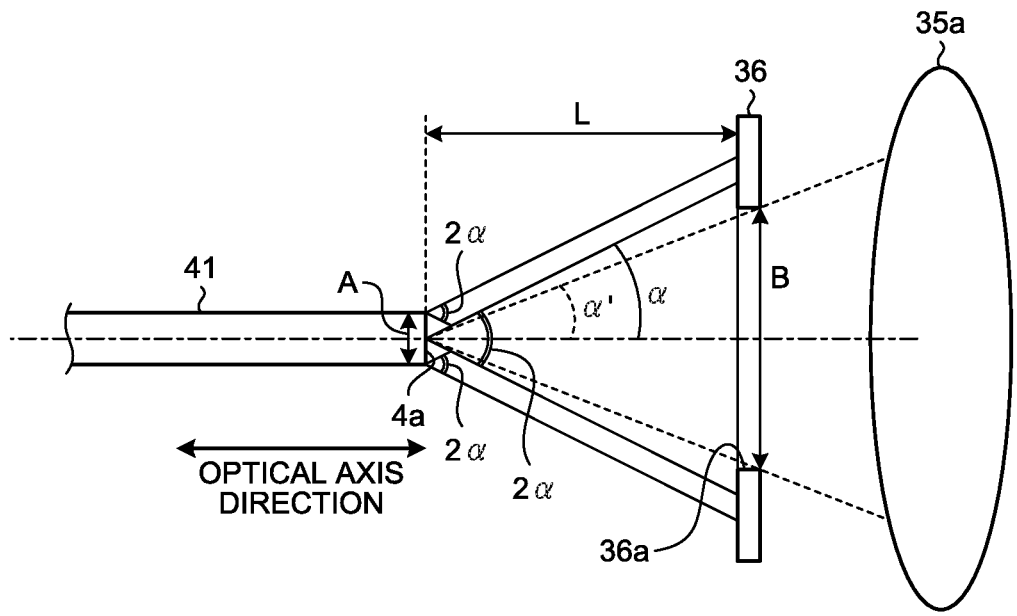
FIG. 4 is a schematic diagram for describing a function of an optical filter according to the embodiment.
Figure 5:
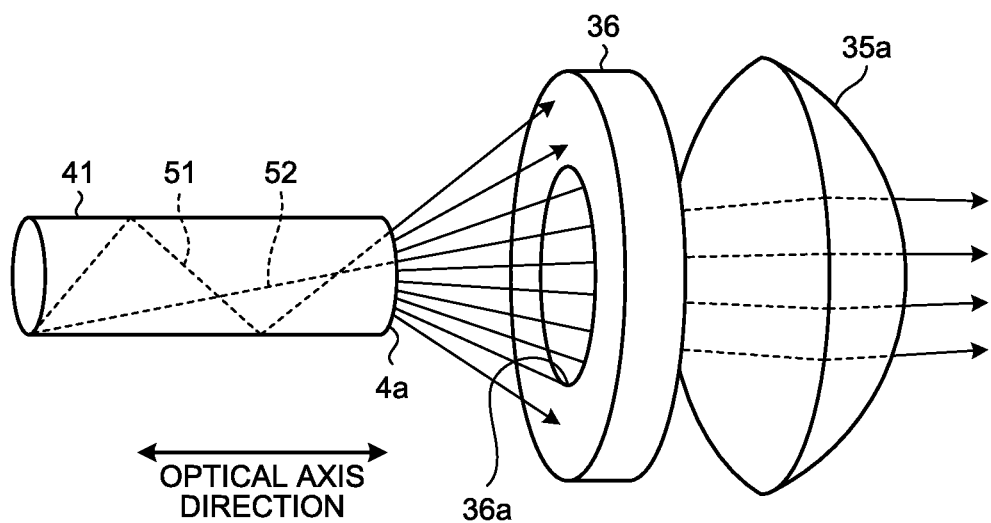
FIG. 5 is a perspective view for describing a function of the optical filter according to the embodiment.
Figure 6:
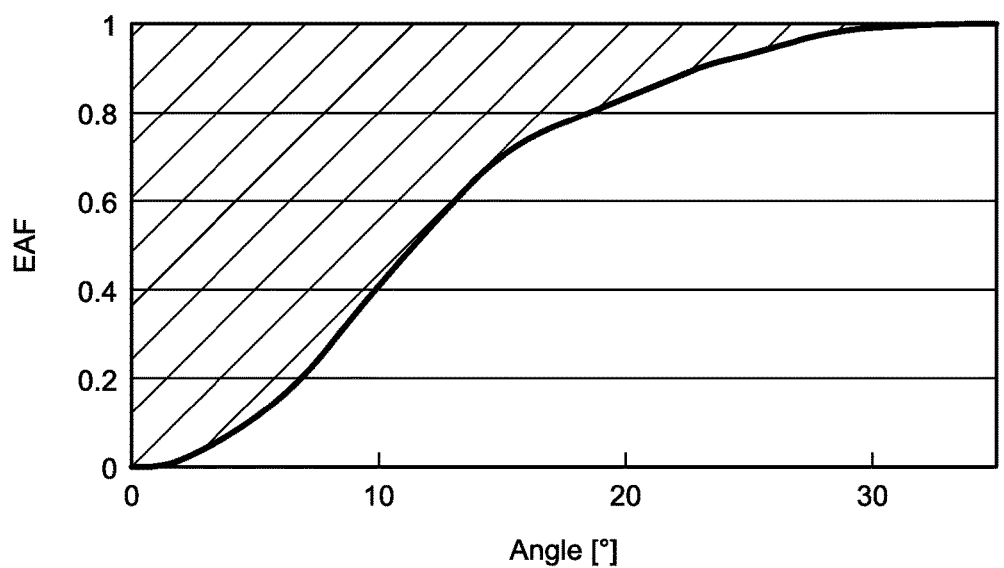
FIG. 6 is diagram illustrating a distribution of maximum transmitted light output angles of transmitted light transmitted through the optical filter according to the embodiment.

FIGS. 1 and 2 are perspective views illustrating a schematic configuration of an optical connector according to an embodiment. FIG. 3 is a cross-sectional view illustrating a schematic configuration of the optical connector according to the embodiment. FIG. 4 is a schematic diagram for describing a function of an optical filter according to the embodiment. FIG. 5 is a perspective view for describing a function of the optical filter according to the embodiment. FIG. 6 is diagram illustrating a distribution of maximum transmitted light output angles of transmitted light transmitted through the optical filter according to the embodiment. In addition, FIG. 1 illustrates an optical connector in a fitted state of a male connector and a female connector. FIG. 2 illustrates the optical connector in a non-fitted state of the male connector and the female connector. FIG. 3 is a cross-sectional view of an A-A cross section in FIG. 1. In FIG. 6, a vertical axis indicates EAF (EAF: Encircled Angular Flux), and a horizontal axis indicates Angle [°].

An optical connector 1 according to the present embodiment is mounted on a vehicle such as an automobile, for example, and connects an optical fiber used as a communication cable, and an electronic device. As illustrated in FIGS. 1 and 2, the optical connector 1 is formed by fitting a male connector 2 and a female connector 3, and optically connects, by the fitting, a pair of optical fibers 4 connected to the male connector 2, and an electronic device (not illustrated) connected to the female connector 3.

As illustrated in FIG. 3, the male connector 2 includes the pair of optical fibers 4, a pair of ferrules 21, a housing 22, and a spacer 23.

One of the pair of optical fibers 4 is for transmission and the other one is for reception. For example, a plastic optical fiber (POF: Plastic Optical Fiber) that uses transparent plastic is used as the optical fibers 4. The optical fibers 4 each have a structure in which a core wire called a core (core) 41 serving as a transmission path of light is surrounded by a clad (clad) 42 being made of the same material but having a different refractive index, and the clad is covered by a nontransparent protective coating 43. An outer diameter A [mm] of the core 41 is about 0.9 mm to 1 mm, for example. The optical fibers 4 are formed of multi mode fibers (MMF: Multi Mode Fiber), for example.

The pair of ferrules 21 is formed of metal material, synthetic resin material, or the like, into a cylindrical shape, and has through-holes in an optical axis direction. The ferrules 21 are provided at leading ends of the optical fibers 4 as connecting end portions, and hold the optical fibers using the through-holes.

The housing 22 is formed of insulating material such as synthetic resin, and has a substantially rectangular parallelepiped shape. A pair of through-holes penetrating in the optical axis direction is formed in the housing 22, and the optical fibers 4 to which the ferrules 21 are attached are respectively inserted into the through-holes.

Similarly to the housing 22, the spacer 23 is formed of insulating material such as synthetic resin. The spacer 23 is provided separately from the housing 22, and fixes the pair of optical fibers 4 to the housing 22 by assembling the pair of optical fibers 4 to the housing 22.

The female connector 3 includes a pair of FOTs 31, a shield case 32, an aligning plate 33, a housing 34, a lens unit 35, and an optical filter 36.

One of the pair of fiber optic transceivers (FOTs) 31 is for transmission and the other one is for reception. The FOT 31 is made of synthetic resin and has a substantially rectangular parallelepiped shape, and has a built-in light-emitting element and a built-in light receiving element thereinside.

The shield case 32 is formed as a hollow cover member having a substantially rectangular parallelepiped shape with two opened surfaces, by pressing a metal thin plate having electrical conductivity. The shield case 32 shields the pair of FOTs 31 by covering the peripheries of the pair of FOTs 31 so as not to leak electromagnetic wave noises to the outside.

The aligning plate 33 is formed of insulating material such as synthetic resin, and on the inner side, has an internal space for accommodating the shield case 32. The aligning plate 33 is latched to the housing 34 by a latch portion provided on the housing 34 side.

The housing 34 is formed of insulating material such as synthetic resin, and has a substantially rectangular parallelepiped shape. In an internal space, the housing 34 has a pair of cylindrical sleeves 34a for holding the pair of optical fibers 4 and the lens unit 35.

The lens unit 35 is made of transparent resin having optical characteristics by integrally forming a flat-plate substrate, and a pair of lenses 35a vertically installed from the substrate. One of the pair of lenses 35a is a light receiving member, and collects light from the optical fibers 4 to the light receiving elements of the FOTs 31, and the other one collects light from the light-emitting elements of the FOTs 31 to the optical fiber 4 side.

The optical filter 36 is formed of insulating material such as synthetic resin that does not pass optical signals in a wavelength band (e.g., 400 nm to 1800 nm) used by a general communication fiber, and disposed between end surfaces 4a in the optical axis direction of the optical fibers 4 and the lenses 35a. The optical filter 36 is disposed at a position distant from the end surface 4a of the optical fiber 4 by a distance L [mm] in the optical axis direction. The optical filter 36 includes a through-hole 36a that transmits part of output light, and has a ring shape when viewed from the optical axis direction. The shape of a cross section of the through-hole 36a that is orthogonal to the optical axis direction is circular, and the through-hole 36a has an inner diameter (diameter) B [mm]. The optical filter 36 is fixed to inner peripheral surfaces of the sleeves 34a of the housing 34.

Next, a function of the optical connector 1 will be described. As illustrated in FIG. 4, when an inner diameter of the through-hole 36a is denoted by B, a distance from the end surface 4a to the optical filter 36 in the optical axis direction is denoted by L, a maximum transmitted light output angle of transmitted light that passes through the through-hole 36a and has a smaller angle than a maximum output angle α[°] of output light is denoted by α'[°], and an outer diameter of the core 41 of the optical fiber 4 is denoted by A, the optical connector 1 preferably satisfies the following formulae (1) and (2).

$$B = 2 \times L \times \tan \alpha' - A \quad (1)$$

$$L > A / \tan \alpha'/2 \quad (2)$$

As illustrated in FIG. 5, output light of the optical fiber 4 includes both higher-order light 51 and low-order light 52. Thus, the higher-order light 51 is emitted at a large output angle, and the low-order light 52 is emitted at a small output angle. In other words, the output light of the optical fiber 4 reaches the lens 35a of the lens unit 35 while spreading from the end surface 4a toward the optical axis direction within a range of the maximum output angle α (2α in reality) illustrated in FIG. 4. The output light that has reached the lens 35a is collected by the lens 35a, and is emitted onto a light receiving surface of the FOT 31 having a built-in light receiving element. In the optical connector 1 of the present embodiment, the optical filter 36 is disposed on an optical path between the end surface 4a and the lens 35a. By using the through-hole 36a of the optical filter 36, part of the optical path is shielded, and part of output light is transmitted. The inner diameter B of the through-hole 36a is defined by the above formula (1) based on the distance L, the outer diameter A of the core 41, and the maximum transmitted light output angle α' of transmitted light that passes through the through-hole 36a and has a smaller angle than the maximum output angle α of output light. The distance L is defined by the above formula (2) based on the outer diameter A of the core 41 and the maximum transmitted light output angle α'. In this manner, by the inner diameter B of the through-hole 36a and the distance L in the optical axis direction from the end surface 4a to the optical filter 36 satisfying the above formulae (1) and (2), the optical filter 36 can block or reduce the transmission of the higher-order light 51 of the output light.

As described above, the optical connector 1 according to the present embodiment includes the optical fibers 4, the lenses 35a that are disposed to face the end surfaces 4a in the optical axis direction of the optical fibers 4, and receive output light emitted from the end surfaces 4a, and the optical filter 36 that is disposed between the end surfaces 4a and the lenses 35a, and includes the through-hole 36a that transmits part of output light. When an inner diameter of the through-hole 36a of the optical filter 36 is denoted by B, a distance from the end surface 4a to the optical filter 36 in the optical axis direction is denoted by L, a maximum transmitted light output angle of transmitted light that passes through the through-hole 36a and has a smaller angle than a maximum output angle α of output light is denoted by α', and an outer diameter of the core 41 of the optical fiber 4 is denoted by A, the following formulae (1) and (2) are satisfied.

$$B = 2 \times L \times \tan \alpha' - A \quad (1)$$

$$L > A / \tan \alpha'/2 \quad (2)$$

The optical connector 1 according to the present embodiment that has the above configuration can block or reduce the transmission of the higher-order light 51 from output light passing on the optical path between the end surfaces 4a in the optical axis direction of the optical fibers 4 and the lenses 35a of the lens unit 35. Thus, deterioration of a waveform of an optical signal that is caused by mixture of the higher-order light 51 and the low-order light 52 can be reduced or suppressed, and high-speed communication can be achieved.

In addition, in the above embodiment, the inner diameter B of the through-hole 36a may be defined using a graph illustrated in FIG. 6, for example. The EAF illustrated in FIG. 6 is a value obtained by integrating an intensity distribution of output angles of output light emitted from the end surfaces 4a of the optical fibers 4, toward a spreading direction of the output angles from the center. In the graph illustrated in FIG. 6, the EAF also increases in accordance with the increase in output angle. For example, in the graph illustrated in FIG. 6, the EAF becomes 0.4 when the output angle is 10[°], the EAF becomes 0.84 when the output angle is 20[°], and the EAF becomes about 1.0 when the output angle is 30[°]. The inner diameter B of the through-hole 36a of the present embodiment is preferably defined so that the maximum transmitted light output angle α' falls within a range corresponding to a shaded portion on the graph illustrated in FIG. 6.

In addition, in the above embodiment, the shape of the cross section of the through-hole 36a that is orthogonal to the optical axis direction is circular. The shape, however, is not limited to this. For example, the cross-sectional shape may be an ellipse shape. In addition, part of an inner circumferential surface of the through-hole 36a may have recesses and protrusions.

In addition, in the above embodiment, the optical filter 36 is fixed to the inner peripheral surfaces of the sleeves 34a of the housing 34. Nevertheless, the optical filter 36 may be formed integrally with the sleeves 34a, or may have a configuration assembled to the sleeves 34a as a separate member.

In addition, in the above embodiment, the optical connector 1 has been described as connecting the optical fibers 4 and an electronic device. Nevertheless, the optical connector 1 is not limited to this, and the present invention may be applied to an optical connector that connects optical fibers.

According to the optical connector according to the present embodiment, such an effect that high-speed communication can be achieved is caused.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:
1. An optical connector comprising:
an optical fiber;
a light receiving member that is disposed to face an end surface in an optical axis direction of the optical fiber, and receives an output light emitted from the end surface; and
an optical filter that is disposed between the end surface and the light receiving member, and includes a through-hole that transmits a part of the output light, wherein
when an inner diameter of the through-hole is denoted by B, a distance from the end surface to the optical filter in the optical axis direction is denoted by L, a maximum transmitted light output angle of a transmitted light that passes through the through-hole and has a smaller angle than a maximum output angle α of the output light is denoted by α', and an outer diameter of a core of the optical fiber is denoted by A, following formulae (1) and (2) are satisfied.

$$B = 2 \times L \times \tan \alpha' - A \quad (1)$$

$$L > A / \tan \alpha'/2 \quad (2)$$

* * * * *